ENCODER

Filed Nov. 29, 1962 2 Sheets-Sheet 1

INVENTORS
JAMES P. NICKLAS
ROBERT H. STOTZ
BY Samuel Lindenberg
ATTORNEY

ENCODER

Filed Nov. 29, 1962 2 Sheets-Sheet 2

JAMES P. NICKLAS
ROBERT H. STOTZ
INVENTORS

BY Samuel Lindenberg

ATTORNEY

United States Patent Office 3,291,910
Patented Dec. 13, 1966

3,291,910
ENCODER

James P. Nicklas, Woodland Hills, Calif., and Robert H. Stotz, Boston, Mass., assignors, by mesne assignments, to The Bunker-Ramo Corporation, Stamford, Conn., a corporation of Delaware Filed Nov. 29, 1962, Ser. No. 240,842
3 Claims. (Cl. 178—26)

This invention relates to apparatus for converting data, which is being produced in one form, into a code suitable for use in a computer, as well as the reciprocal operation thereof, and more particularly to improvements in this type of apparatus.

One of the input devices presently employed with present day computers is the typewriter. Computers sometimes also use a typewriter as an output device where high speed output printing is not required. There are a number of different arrangements for converting the mechanical actuation of a typewriter key into a code which the computer can process. These may be by way of photoelectric detection, actual mechanical switch contacts which are selectively actuated or other arrangements. Another favored method for entering data from a typewriter into a computer or for operating the typewriter from the computer is to use a teletypewriter arrangement and then convert the teletypewriter code into computer code, as well as vice versa.

All these previously known typewriter encoding and decoding arrangements are complex, requiring complex typewriter construction as well as expensive associated electronic equipment.

An object of this invention is the provision of a simple arrangement for encoding the data typed by a typewriter, and also for performing the reciprocal process.

Another object of this invention is the provision of a novel arrangement for converting the actuation of a typewriter key into a representative code as well as for performing the reciprocal process.

Yet another object of this invention is the provision of a relatively trouble-free and inexpensive encoding and decoding system.

These and other objects of the invention may be achieved in an arrangement wherein a shift register is provided together with a counter. Each key on the typewriter can be made capable of designating both upper and lower case characters or only lower case characters. Keys capable of designating two characters are each associated with two shift register stages. While keys capable of designating only one character are associated with only one shift register stage. The more general case where all keys are capable of designating two characters will hereafter be assumed. One of the two shift register stages designates the lower case character (e.g., numbers) and the other the upper case character (symbols). Thus, when a key of the typewrite is actuated, the associated shift register stages are actuated to store unique binary signals therein. Thereafter, a source of clock pulses starts the shift register shifting serially and simultaneously energizes a couner to commence counting. A sensing circuit is provided at the output of the shift register which detects when the stored binary signals reach the end of the shift register. If the shift key or upper case desginating key of the typewriter has been actuated, then appropriate means cause the binary signal representing the lower case character to be disregarded. Upon detection of the proper binary signal at the output of the shift register, shifting ceases and further pulses are prevented from being applied to the counter. At that time the count in the counter represents the code equivalent of either the upper or lower case character designated by the key which had been depressed on the typewriter. This is sensed and either stored on tape for subsequent entry or if desired may be directly introduced into a computer. Operation of the next key on the typewriter resets the counter and enables the encoding operation for the actuated key to commence again.

For performing the decoding process, coded signals representing a character desired to be printed by the typewriter are entered from the computer into a register. At the same time a single binary signal is introduced into the first stage of a shift register. Clock pulses are then applied to a counter and also to the shift register to cause it to commence shifting the binary signal through the successive stages. The counter functions to count the applied pulses. This operation continues until the comparator provides an output indicative of the fact that the count in the counter and the code in the register are identical. The comparator output prevents further counting and shifting, clears the counter, and enables a gate associated with the stage of the shift register to which the binary signal has been advanced to provide an output. The gate has its output connected to a solenoid which actuates the typewriter key. If the binary signal has been advanced to the stage of the shift register associated with upper case representation of the character then not only is the character key on the typewriter actuated but also the shift or upper case key is actuated. In this manner the typewriter can print the character which the computer has provided.

Other objects and advantages, which will subsequently become apparent, reside in the details of circuitry and operation as more fully hereinafter described and claimed, further reference being made to the accompanying drawings forming a part hereof, wherein like identifying numerals refer to like parts throughout the several figures, and in which:

Figure 1:
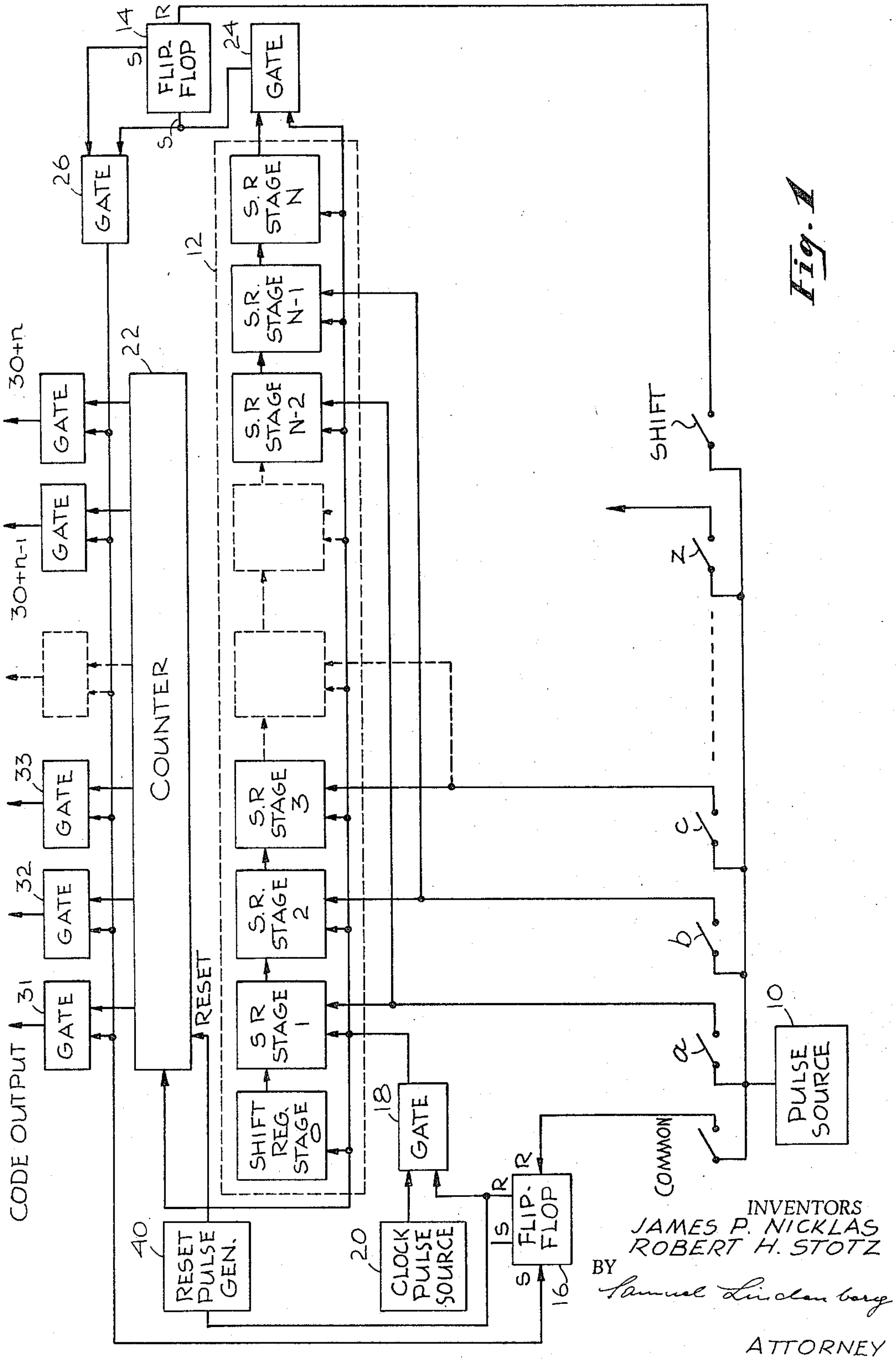
FIGURE 1 is a block schematic diagram of an encoder in accordance with this invention.

Referring now to FIG. 1 there may be seen a block diagram of an embodiment of the invention for converting an actuated typewriter key into a code suitable for use by a computer. Each typewriter key, in accordance with this invention, when actuated is required to close a switch. Typewriters with this capability and structure are well known. These single-pole single-throw switches are represented by switch symbols in FIG. 1 which have the designations *a*, *b*, *c* . . . *z*, to correspond to the key on the typewriter whereby these switches may be closed. There is also shown a switch in FIG. 1 labeled "shift." This switch is actuated when the key on the typewriter which causes the typewriter to print the upper case representation of a selected character, is actuated. There is also a switch labeled "common." This switch is closed when any of the switches *a* to *z* are closed.

All the switches *a*, *b*, *c* . . . *z* and shift, have one terminal connected to a pulse source 10. The other side of each one of the character representing switches is connected to one or two stages of a shift register 12. Thus the *a* switch is connected to the shift register stage 1 and to the shift register stage N–2. The other side of the *b* switch is connected to the shift register stage 2 and the shift register stage N–1. Should a character key, such as the one associated with switch "*a*" for example, be actuated, then a pulse from the pulse source 10 is applied to the shift register stage 1 and the shift register stage N–2 so as to effectively introduce a binary signal into each of these stages. Should the shift key and its associated switch be actuated, it operates to reset a flip-flop 14. However, the situation will first be considered where the shift switch is left unoperated.

The common switch, which is activated concurrent with the actuation of the switches *a*, *b*, *c*, etc., causes a flip-flop circuit 16 to be driven to its reset state by the pulse received from the pulse source 10. When flip-flop 16 is driven to its reset state it applies its output to a gate 18 which also has applied thereto pulses from the clock pulse source 20. Gate 18 is opened by the flip-flop 16 reset output and applies pulses to the shift register 12 to cause it to commence serially shifting its contents. Pulses from the gate 18 are also applied to a counter 22 to cause it to commence counting in a forward direction.

The shift register will continue shifting and the counter will continue counting until the first binary signal is shifted from the last stage of the shift register 12 into gate 24. The output of the gate 24 is applied to a gate 26 which will be open to provide an output only when the flip-flop 14 is in its set state. The gate 26 applies its output to the flip-flop 16 driving this flip-flop to its set state whereby gate 18 is closed and the counter 22 is prevented from increasing its count and the shifting is terminated. The count in the counter at this time is the code representation of the character which had been selected by actuation of the key on the typewriter. Each one of the counter outputs is applied to a different gate respectively 31, 32 . . . 30+*n*. The output from the gate 26 enables all of these gates whereby the count in the counter 22 is sensed. The output from the various gates may then be applied to a storage medium for subsequent introduction into the computer or may be introduced directly into the computer as the code representation of a character selected by the typewriter key.

The counter 22 may be any type which counts in accordance with the code employed by the computer. Thus it may be a strictly binary counter, a binary coded decimal counter, or a Gray code counter, etc. The assignment of a code for a particular input character is made by the appropriate correction of the switches to the shift register positions once the counter sequence is defined.

Assume now that it is desired to type a character on the typewriter in upper case form and also to enter this fact into the computer. Again assume that the key associated with switch "*a*" is depressed but this time in conjunction with the shift or upper case key. The shift key resets the flip-flop 14. The common contract resets flip-flop 16 which applies an output to a reset pulse generator 40, and also which enables the gate 18. The reset pulse generator 40 applies a single pulse to reset the counter 22 to its initial count condition. The pulse source 10 enters a binary bit into the shift register stage 1 and the shift register stage N–2. Pulses from the clock pulse source 20 advance the shift register and also advance the counters 22. When the binary bit in the N–2 stage of the shift register is applied to the gate 24, gate 24 applies its output to gate 26. At this time however, since gate 26 is not receiving a set output from the flip-flop 14 it remains closed and therefore the lower case representation of the key selected on the keyboard of the typewriter is disregarded. The output of gate 24 at this time however, serves to drive the flip-flop 14 to its set state. This set state is reached at a time after the succeeding clock pulse has shifted the shift register and therefore the output from the shift register which initiated the setting operation of flip-flop 14 is removed before the flip-flop can attain its set state. Therefore, unless the succeeding shift register stage stored a binary one bit gate 26 will not emit an output. Gate 26 remains closed until the next binary bit, representing the upper case representation of the selected character, reaches the last stage of the shift register. At this time the operation previously described occurs. That is, no more clock pulses are applied to the shift register or to the counter and the counter output is entered into the computer.

The operation of the described circuitry occurs at a sufficiently high speed so that as far as the typist is concerned typing can continue at normal speeds and no slow down, because of the association with the encoder, is required.

Figure 2:
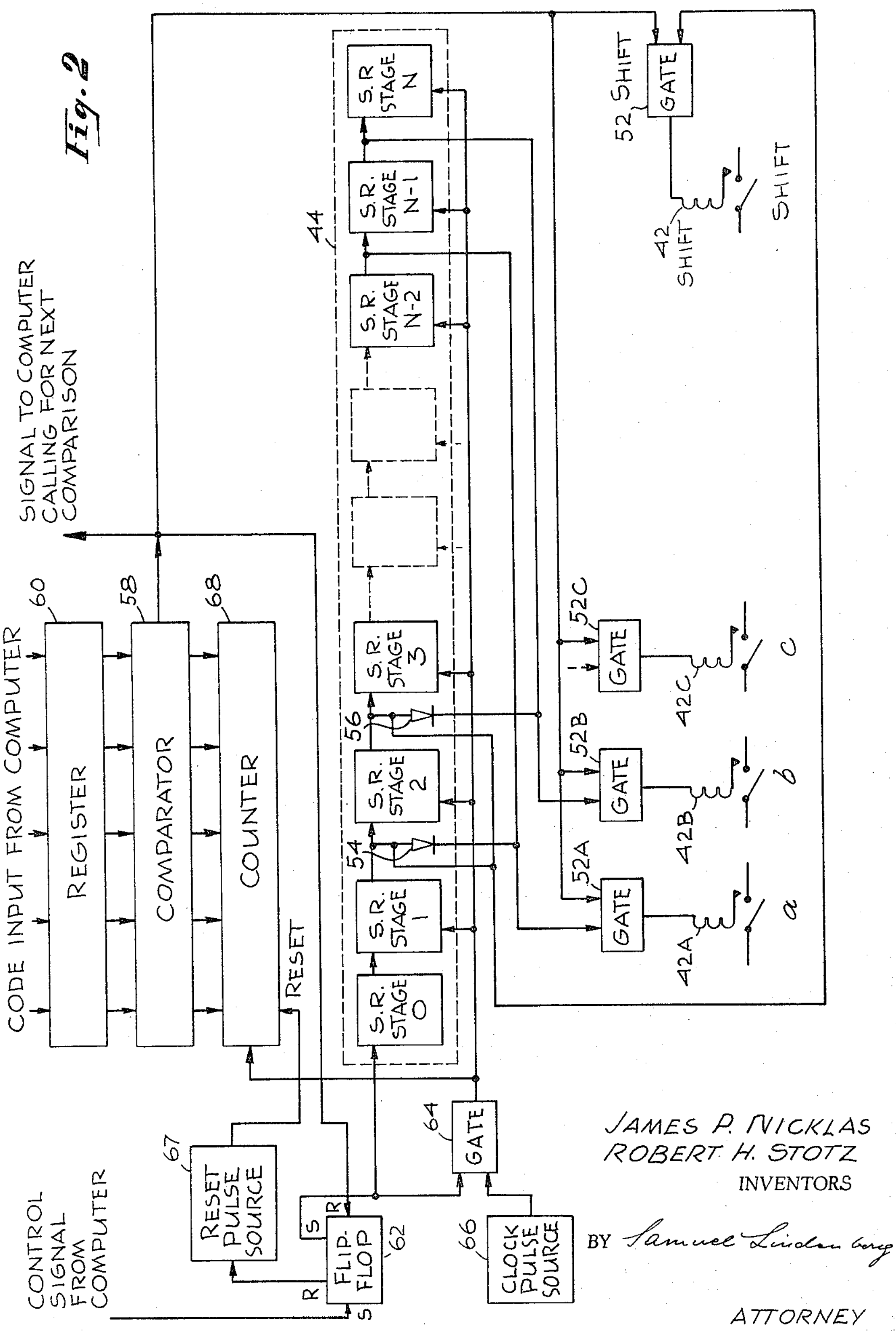
FIGURE 2 is a block schematic diagram of a decoder in accordance with this invention.

Referring now to FIG. 2 there may be seen an arrangement for converting a computer code into a form which can actuate the keys on a typewriter to print out the code. Typewriter keys *a*, *b*, *c* . . . *z* and shift are represented in FIG. 2 as switches. Associated with each one of the keys is an individual solenoid respectively, 42A, 42B, 42C, 42Z and 42 shift. A shift register 44, which may be the identical shift register as the one shown in FIG. 1 is employed. Each two shift register stages which correspond to and are associated with a typewriter key have their outputs connected to a different gate. Thus, for example, shift register stage 1 and shift register N–2 have their outputs connected to a gate 52A. The outputs of all the upper case representing shift register stages are all also connected to a gate 52 shift. A diode 54 is connected between the output of shift register stage 1 and shift register stage N–2 to prevent the output from the shift register stage N–2 from falsely operating the shift gate 52 shift. Similarly, a separate blocking diode serves to connect the output of each upper case representing shift register stage to the output of its associated lower case representing shift register stage.

Thus, by way of further example, since the shift register stages N–1 and 2 were respectively associated with the lower and upper case B, then these two shift register stages have their outputs connected to the input to gate 52B. A diode 56 is placed between the output of shift register stage 2 and the output of shift register stage N–1. A connection is made to gate 52 shift from the side of the diode 56 which is closest to the output of stage 2. All of the gates to which the outputs of the shift register are applied are maintained closed until they receive an output from the comparator 58, which occurs when it senses an identity of inputs.

The code character desired to be typed is entered from the computer into the register 60. At the same time a signal from the computer is applied to a flip-flop 62 to drive it to its set state. The output of flip-flop 62, when in its set state, inserts a unique binary signal into the zero stage of the shift register 44, and also enables a gate 64 to commence applying clock pulses from a source 66 to a counter 68 and to the shift register 44 to cause it to commence shifting. The counter 68 starts counting from zero and continues counting until such time as the comparator 58 senses an identity between the count in the counter and the contents of the register 60. At this time the comparator 58 provides an output signal to the gates 52A, 52B . . ., each of which is associated with two stages of the shift register, as well as to the gate 52 shift. In addition the comparator output resets the flip-flop 62 whereupon a reset pulse source 67 is energized to reset the counter 68. By this time, one of the gates 52A, 52B, 52C, etc., as well as the gate 52 shift has energized the one of the solenoids 42A, 42B . . . 42 shift which is connected to the shift register stage in which the unique binary signal is stored at the time the comparator output has occurred. Thus the one of the typewriter keys *a*, *b*, *c* . . . *z* and/or shift which is associated with the code initially entered into the register 60 is operated and the typewriter prints the corresponding character.

The output of the comparator is also fed back to the computer signaling to it that the decoding operation has been completed and the next code character is to be entered into the register 60. Suitable provision may be made to clear the shift register 44 as well as the register 60 by a signal from the computer just prior to entering the new code character into the register 60.

Accordingly, there has been described and shown herein a novel, useful and simplified arrangement for encoding a character selected on a typewriter keyboard by actuating a key into a code form suitable for use in a computer. The reciprocal process has also been described. While the foregoing description of the coder-decoder of this invention has been made in association with a typewriter, those skilled in the art will readily appreciate that its utility is more widespread and that other devices may be used to supply data to the shift register for encoding and to receive decoded data therefrom. Thus, for example, each stage of the register may be associated with each hole position of a punched card. Each stage of the register may be selected by a different code, etc. Therefore, the foregoing description of the utility with a typewriter is illustrative and not restrictive.

The following is claimed as new:

1. Apparatus for encoding different symbols each manifested by a different physical representation into an electrical code, and for converting an electrical code into the symbol represented thereby comprising a shift register having a plurality of different shift register stages each of which is associated with a different one of said symbols, means for inserting a binary signal into the one of said shift register stages which is associated with a symbol desired to be converted into a code, a counter, a source of clock pulses, means responsive to the entry of a binary signal into one said shift register stages for applying clock pulses from said source to said shift register to shift the contents toward one end and to said counter to cause it to count, gate means connected to said one end of said shift register for sensing the appearance of said binary signal and producing an output, and means responsive to said gate means output, for terminating further application of clock pulses to said shift register to said counter whereby the count in said counter is a code representation of said symbol, register means into which the code representation of a symbol is entered, means for comparing the contents of said register means with the count in said counter and providing an output signal upon the occurrence of an identity, means for entering a binary signal into one end of said shift register, means responsive to the entry of a code representation into said register, means for applying pulses from said clock pulse source to said counter and to said shift register to cause them to count and shift together, means responsive to an output from said comparator to terminate further application of pulses to said counter and shift register means responsive to said comparator output to drive an output from the shift register stage to which said binary signal has been shifted, and means responsive to said comparator output and said shift register stage output to provide an indication of the symbol represented by the code inserted in the register.

2. Apparatus for actuating a typewriter key responsive to a code representative of the character printed by actuation of said key comprising a shift register having a plurality of stages, each stage being associated with a different one of said typewriter keys, register means into which said code is entered, counter means, comparator means for comparing the count of said counter means and the contents of said register means and providing an output signal when they are identical, a clock pulse source, means responsive to the entry of a code character into said register means for applying a binary signal to the first stage of said shift register and for applying clock pulses to said counter to be counted and to said shift register to cause it to shift, a plurality of gates, means connecting the output of each one of said shift register stages to the input of a different one of said gates, means responsive to an output from said comparator means indicative of an identity between the contents of said register means and the count of said counter means for terminating the further application of pulses from said source to said counter and to said shift register and for opening said plurality of gates, and means responsive to the transmission through one of said gates of said binary signal for operating the typewriter key associated with the shift register stage containing said binary signal at the time of said comparator output signal.

3. Apparatus for actuating a typewriter key and the associated shift key when specified from code representations of upper case and lower case characters which are printed by said actuated typewriter keys comprising register means into which a code character is entered, counter means, comparator means for comparing the contents of said register means and said counter means and for providing an output signal indicative of an identity therebetween, a shift register having a plurality of shift stages a different two of which are respectively associated with a typewriter key character, the first of said two stages being associated with said character in its lower case form and the second of said two stages being associated with said character in its upper case form, a plurality of gates, means connecting the output of each two shift register stages associated with a typewriter key to a different one of said gates, a plurality of key actuating solenoids for said typewriter, means for connecting the output of a different one of said gates to the key actuating solenoid which key is associated with the shift register stage having its input connected to said gate, a clock pulse source, means responsive to the entry of a code character into said register means for applying a binary digit to the first stage of said shift register and for applying clock pulses to said counter and to said shift register to cause them to simultaneously count and shift, means responsive to an output from said comparator for terminating the further application of pulses from said source to said shift register and to said counter and for enabling said plurality of gates whereby the key solenoid connected to the gate which is connected to the output of the shift register stage storing said binary signal is actuated, and gate means for sensing the presence of said binary signal in the shift register stage associated with the upper case character for energizing the shift key of said character simultaneously with the one of said key solenoids.

References Cited by the Examiner

UNITED STATES PATENTS

| | | | |
|---|---|---|---|
| 2,612,562 | 9/1952 | Baker | 178—79 |
| 2,894,067 | 7/1959 | Hausman | 178—26.5 |
| 3,162,725 | 12/1964 | Oleson | 178—79 |
| 3,194,886 | 7/1965 | Mason | 178—88 |
| 3,205,305 | 9/1965 | Clark | 340—167 |

NEIL C. READ, *Primary Examiner.*

THOMAS B. HABECKER, *Examiner.*